United States Patent [19]

Thompson

[11] 3,955,580

[45] May 11, 1976

[54] IDENTIFICATION TAG AND INSERTION TOOL FOR CATTLE

[76] Inventor: Roy Dale Thompson, 12698 Ojai Road, Santa Paula, Calif. 93060

[22] Filed: Mar. 20, 1975

[21] Appl. No.: 560,129

[52] U.S. Cl. ................................. 128/330; 40/301
[51] Int. Cl.² .................... A61D 1/00; A61B 17/00
[58] Field of Search ............... 40/300, 301; 128/330

[56] References Cited
UNITED STATES PATENTS

| | | | |
|---|---|---|---|
| 3,334,434 | 8/1967 | Melin | 128/330 X |
| 3,694,949 | 10/1972 | Howe | 40/301 |
| D229,571 | 12/1973 | Fearing | 40/301 X |

FOREIGN PATENTS OR APPLICATIONS

| | | | |
|---|---|---|---|
| 844,828 | 6/1970 | Canada | 40/301 |

*Primary Examiner*—Channing L. Pace
*Attorney, Agent, or Firm*—Ralph B. Pastoriza

[57] ABSTRACT

The identification tag is in the form of a flexible plastic disc having a fastening portion in the shape of an inverted T, the stem of the T extending from a peripheral portion of the disc. A U-shaped strip of metal serves as an inserting tool and is arranged to straddle the disc, a first arm terminating in a square end and the second arm being longer than the first arm and terminating in a point. The arrangement is such that the inverted T-shape can be flexed towards an upright position so that the square end of the first arm can be received between the stem and cross portion of the T with the second arm holding the underside of the second cross portion of the T and stem in their flexed positions. A cow's ear is then pierced by the point on the second arm, the first arm urging the T-shape through the cut opening. Withdrawal of the U-shaped arms then permits the T-shape to flex back to its normal position to secure the tag to the cow's ear.

3 Claims, 7 Drawing Figures

IDENTIFICATION TAG AND INSERTION TOOL FOR CATTLE

This invention relates to identification tags for cattle and more particularly to an improved combination identification tag and insertion tool for securing the tag to a cow's ear.

BACKGROUND OF THE INVENTION

It is normal practice for ranchers to identify their cattle by branding the cattle with an identification number or symbol. In those cases where the stock is registered, the identification number or symbol would correspond to the registered stock number or an abbreviation thereof. Where cattle is not registered, the rancher may utilize any numbering or lettering system he chooses to identify individual cattle.

To ascertain the number or identification of a cattle wherein the same has been branded on the cattle, requires a relatively close inspection. As a result, it is common practice to provide a relatively large identification tag bearing the numbers or symbols in easy-to-read large figures. This tag is secured to a portion of the cattle, such as the ear.

Prior art identification tags generally take the form of a disc member having a fastening arrangement together with a suitable tool which will form a hole in a portion of a cow's ear and also help guide the fastening portion of the tag through the opening. As an example, the insertion tool may include a lateral projection which catches within an opening formed in the fastening portion of the identification disc such that when the tool is urged through a cut opening in the cow's ear, the projecting portion will pull the fastening part of the disc through the opening. This arrangement as well as other prior art insertion tools and identification discs requires a relatively large slit or opening to be cut in the cow's ear to accommodate the insertion tool portion itself with its lateral pulling projection coupling with the fastening portion of the disc. If the cut opening is too large, proper securement of the tag cannot always be assured. On the other hand, if a minimal sized opening is made, the insertion process itself cannot easily be performed by the rancher and also runs the risk of damaging the cow's ear or possibly resulting in infections.

BRIEF DESCRIPTION OF THE PRESENT INVENTION

With the foregoing in mind, the present invention contemplates the provision of an improved identification disc structure and insertion tool coacting together in a manner to greatly facilitate the insertion of the tag in a cow's ear with minimum mutilation of the cow's ear and maximum securement of the tag itself.

More particularly, the tag and insertion tool of this invention comprises a disc having a flexible fastening portion of inverted T-shape with the end of the stem of the T extending from a peripheral portion of the disc away from the plane of the disc. The insertion tool comprises an elongated member having first and second arms for straddling opposite faces of the disc with the first arm terminating in a square end and the second arm terminating in a point and being of a greater length than the first arm.

With the foregoing arrangement, the inverted T-shape can be flexed towards an upright position with the square end of the first arm received between the stem and one cross portion of the T-shape, the other arm passing under and holding the stem of the T-shape and the other cross portion in their flexed positions. The point on the second arm can then pierce the ear of a cow to provide an opening and the T-shape then urged through the opening by the first arm pushing against the inner section of the underside of the one cross portion and stem of the T. Withdrawal of the arms is easily accomplished permitting the T-shape to then assume its original position relative to the disc so that the cross portions of the T-shape overlie the upper and lower edges of the opening to thereby secure the disc to the cow's ear.

The foregoing structural arrangement enables the insertion tool to be designed without any lateral projections which have heretofore been necessary to engage the fastening portion of the disc to pull it through the opening. Rather, a pushing action is employed, the arms of the insertion tool having smooth flat surfaces so that a minimal sized opening in the cow's ear is all that is necessary and insertion and withdrawal can easily be performed.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
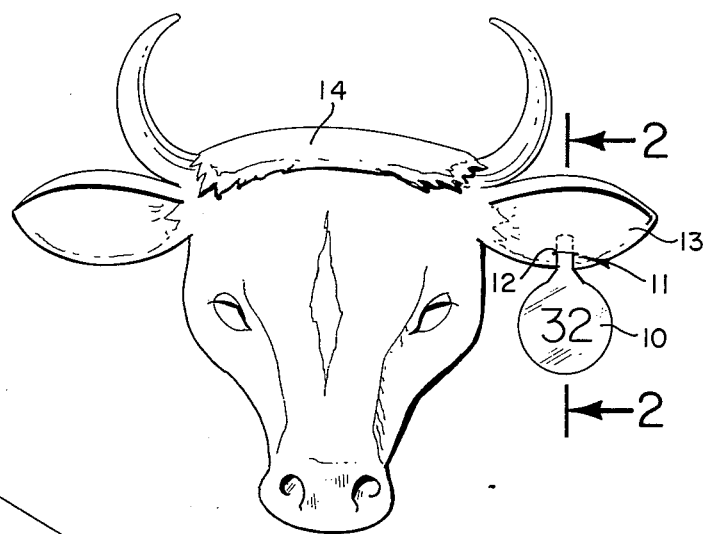
FIG. 1 is a front elevational view of a cow's head illustrating the identification tag secured to one ear of the cow in position for easy reading.

Referring first to FIG. 1, the identification tag is in the form of a circular, flexible, plastic disc 10 having an integrally formed fastening means designated generally by the numeral 11 shown inserted through an opening 12 in the ear 13 of a cow 14. It will be noted that the tag 10 depends in a position for easy viewing of a suitable identification symbol or number such as the number 32.

Figure 2:
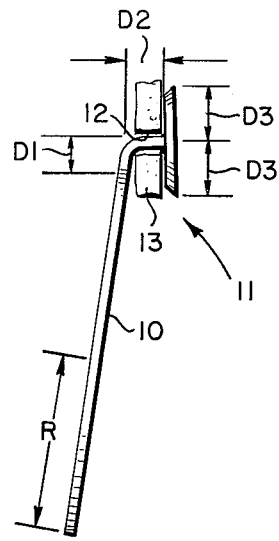
FIG. 2 is a cross section of the identification tag taken in the direction of the arrows 2—2 of FIG. 1.

Referring to the cross section of FIG. 2, it will be evident that the fastening portion 11 constitutes an integral part of the disc 10. Essentially, this fastening includes a first portion extending from the upper portion of the disc a first given distance designated D1, thence turning at right angles in a direction opposite from the face to define a second portion extending for a second distance designated D2. In FIG. 2, this portion D2 is shown passing through the opening 12 of the cow's ear 13. The second portion terminates in first and second flanges extending respectively distances designated D3 and lying substantially in a plane parallel to the plane of the disc 10.

Figure 3:
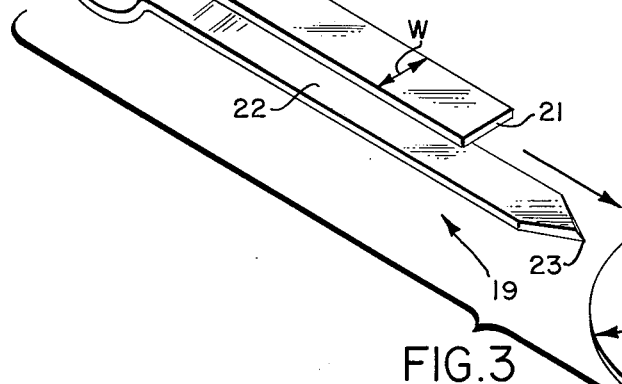
FIG. 3 is an exploded perspective view of the identification tag separated from the cow's ear together with the insertion tool utilized therewith.

The foregoing will be clearer by referring to FIG. 3 wherein the radius of the disc 10 is designated by the letter R, the first portion extending for a distance D1 by the numeral 15, the second portion extending for the distance D2 by the numeral 16, and the first and second flanges extending for distances D3 by the numerals 17 and 18.

It will be evident from FIG. 3 that the second portion 16 and extending flanges 17 and 18 essentially define an inverted T-shape when viewed from the side, the second portion 16 constituting the stem of the T and integrally connecting to a peripheral portion of the disc 10 through the first portion 15. The width of the stem 16 and flanges 17 and 18 is designated W in FIG. 3. The dimensioning is such that the distances D1, D2, D3 and W are each between one-half and one-sixth the radius R. In the preferred embodiment, these specific dimensions are about equal to one-third R.

Also illustrated in FIG. 3 is an insertion tool designated generally by the numeral 19 in the form of an elongated strip member of width W approximately the same as the width W of the stem and flange portions of the T as described. As shown, this strip is folded on itself to define an elongated U-shape, a first arm 20 of which terminates in a square end 21 and the second arm 22 of which is of greater length than the first arm and terminates in a point 23.

In utilizing the insertion tool 19, the strip member is positioned to straddle the disc 10 lying along a diameter thereof with the first arm 20 overlying the face.

Figure 4:
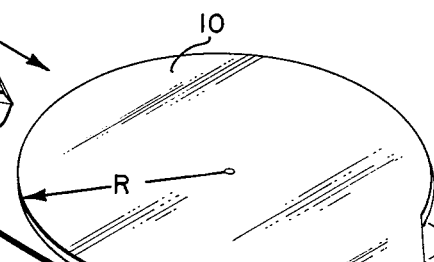
FIG. 4 is a side elevational view illustrating a first step in positioning the insertion tool relative to the identification tag preparatory to securing the same to a cow's ear.

FIG. 4 shows in side elevational view this straddled position of the first and second arms 20 and 22 relative to the disc 10. It will be noted that the length of the first arm 20 is designated L1 and in accord with an important feature of this invention, the length L1 is greater than the distance 2R+D1. The arm 22 which is longer than the arm 20 in turn has a length L2 greater than 2R+D1+D2+D3.

By providing the insertion tool with the foregoing dimensions, it can effectively operate to insert the fastening means of the tag through the cow's ear.

Figure 5:
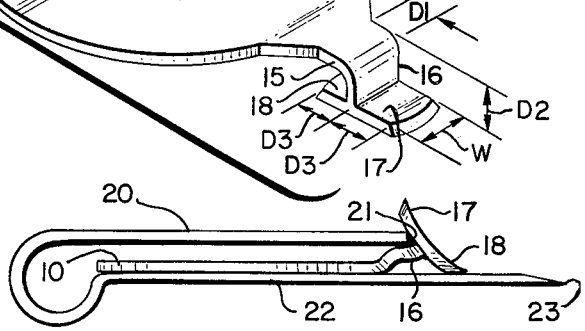
FIG. 5 is a view similar to FIG. 4 illustrating a subsequent step in the insertion process.
Figure 6:
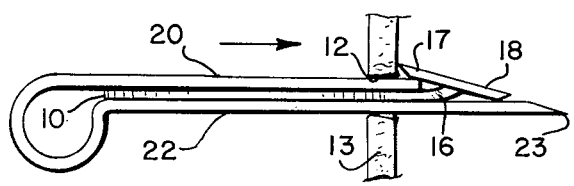
FIG. 6 is a view similar to FIGS. 4 and 5 but illustrating the relative positions of portions of the disc and insertion tool after an insertion has been made through the cow's ear; and, FIG. 7 shows the positions of the tag and insertion tool after withdrawal of the insertion tool.
Figure 7:
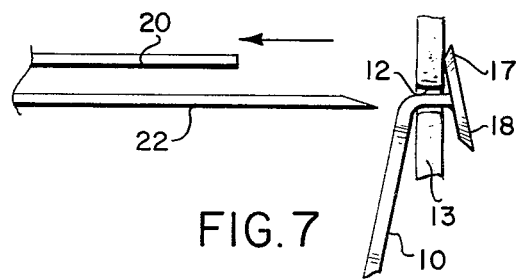

The manner in which actual insertion is accomplished will be evident from FIGS. 5, 6 and 7. Referring to FIG. 5, it will be noted that after positioning of the arms in the straddled position illustrated in FIG. 4, the first flange 17 and stem portion 16 are flexed upwardly so that the inverted T-shape approaches an upright position. When in this position, the square end 21 of the first arm 20 can be received under the first flange 17 as clearly illustrated in FIG. 5. Also, it will be noted that the second arm 22 of the strip member underlies the second flange 18 and stem portion 16.

In FIG. 6, it will be noted that a fairly flat configuration results when the U shaped strip member is squeezed, the second arm 22 again bearing against the stem 16 and second flange 18 to hold the flexed T-shape structure in position. Since the second arm 22 is of greater length than the diameter of the disc (2R) plus the distances D1, D2 and D3, the point 23 will extend beyond the second flange 18. This point can then be used to pierce the ear of the cow to provide an opening, the first arm 20 serving to push against the first flange 17 and stem portion 16 of the flexed T-shape at their intersection. In other words, the square end 21 bears against this point to urge the flexed T-shape through the opening in the cow's ear. In FIG. 6 this opening is again designated 12.

After the opening has been made in the ear and the inverted T-shape pushed therethrough, it is a simple matter to withdraw the first and second arms of the insertion tool as indicated in FIG. 7, the T-shape flexing back to its normal position wherein the first and second flanges 17 and 18 will overlie the upper and lower edges of the opening 12 to the rear or far side of this opening.

The tag and fastening means thus shown in FIG. 7 assume the final position illustrated in the cross section of FIG. 2, the same being securely fastened to the cow's ear.

It is to be noted from the foregoing that the first and second arms 20 and 22 have smooth opposite surfaces with no projections. Further, by utilizing a pushing action as a consequence of the T-shape structure of the fastening means and the flexing of the same to the position illustrated in FIG. 6, a fairly narrow profile results so that a large cut in the cow's ear is not necessary. Moreover, the withdrawal of the insertion instrument is very simple and is completely uninhibited since there are no projections or portions of the tag construction or on the arms of the insertion tool which could cause snagging.

The identification tag and insertion tool of the present invention accordingly provides an arrangement wherein the tag can be easily fastened to a cow's ear with minimum damage to the cow and with an end result which assures a positive securement of the tag in place. Moreover, by providing the right angle bend in the portion where the stem of the T connects to the peripheral portion of the disc, the disc itself will depend in a generally vertical plane from the cow's ear and thus be readily readable.

The present invention has thus provided an improved identification tag and insertion tool which overcomes certain disadvantages associated with prior art devices.

What is claimed is:

1. An identification tag and insertion tool for cattle, comprising:
   a. a disc having a flexible fastening including a stem and cross portion defining an inverted T-shape with the end of said stem of the T extending from a peripheral portion of the disc away from the plane of the disc; and
   b. an elongated member having first and second arms for straddling opposite faces of the disc with the first arm terminating in a square end and a second arm terminating in a point and being of a greater length than the first arm whereby the inverted T-shape can be flexed towards an upright position with the square end of said first arm received between the stem and one cross portion of the T-shape, the other arm passing under and holding the stem of the T-shape and the other cross portion in their flexed positions so that the point on said second arm can pierce the ear of a cow to provide an opening in a generally vertical plane when the cow is standing and the T-shape then urged through the opening by the first arm, withdrawal of the arms permitting the T-shape to assume its original position relative to the disc so that the cross portions of the T-shape overlie the upper and lower edges of the opening to thereby secure the disc to the cow's ear.

2. An identification tag and insertion tool for cattle, comprising in combination:

a. a circular flexible plastic disc of radius R having one face for identification marking and an integrally formed first portion extending from the disc for a first distance D1 thence turning at right angles in a direction opposite from the face to define a second portion extending for a second distance D2, said second portion terminating in first and second flanges extending respectively distances D3 in opposite directions and lying substantially in a plane parallel to the plane of the disc so that the second portion and flanges define an inverted T-shape when viewed from the side, the second portion and flanges having a width W, the distances D1, D2, D3 and the width W each being between one-half and one-sixth the radius R; and b. an elongated strip member of width approximately the same as said width W folded on itself to define an elongated U-shape, a first arm of which has a length greater than $2R+D1$ and terminating in a square end and the second arm of which has a length greater than $2R+D1+D2+D3$ terminating in a point, whereby said strip member can be positioned to straddle the disc lying along a diameter thereof with the first arm overlying the face and arranged to have its square end received under said first flange by flexing said second portion radially outwardly and flexing said first flange towards said face to overlie said end of the first arm of the strip member, the second arm passing along the opposite face of the disc to extend under and beyond the end of the second flange to hold the second portion and flanges in their flexed positions and so that its point can pierce a portion of the ear of a cow to provide an opening, the first arm serving to push the second portion and flanges through the opening, withdrawal of the strip member resulting in the second portion flexing back to its initial position so that said flanges overlie upper and lower edges of the far side of the opening to thereby secure the disc to the cow's ear in a position facing forwardly for easy observation.

3. The subject matter of claim 2, in which D1, D2, D3 and W are each equal to about one-third R.

* * * * *